US010189959B2

(12) United States Patent
Mor

(10) Patent No.: US 10,189,959 B2
(45) Date of Patent: *Jan. 29, 2019

(54) HYDROPHOBIC ADDITIVE FOR USE WITH FABRIC, FIBER, AND FILM

(71) Applicant: TECHMER PM, LLC, Rancho Dominguez, CA (US)

(72) Inventor: Ebrahim Mor, Laguna Niguel, CA (US)

(73) Assignee: TECHMER PM, LLC, Rancho Dominguez, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,593

(22) Filed: Sep. 1, 2017

(65) Prior Publication Data
US 2017/0362397 A1 Dec. 21, 2017

Related U.S. Application Data

(63) Continuation of application No. 13/241,744, filed on Sep. 23, 2011, now Pat. No. 9,751,993, which is a continuation of application No. 12/491,469, filed on Jun. 25, 2009, now Pat. No. 8,026,188.

(51) Int. Cl.
C08J 3/22 (2006.01)
D06M 13/224 (2006.01)
D04H 1/00 (2006.01)
C08J 5/18 (2006.01)
C08K 5/103 (2006.01)
D01F 1/10 (2006.01)

(52) U.S. Cl.
CPC .............. C08J 3/226 (2013.01); C08J 5/18 (2013.01); C08K 5/103 (2013.01); D01F 1/10 (2013.01); D04H 1/00 (2013.01); D06M 13/2243 (2013.01); C08J 2323/02 (2013.01); D06M 2200/12 (2013.01); Y10T 442/20 (2015.04); Y10T 442/2164 (2015.04); Y10T 442/2189 (2015.04); Y10T 442/2213 (2015.04); Y10T 442/2221 (2015.04); Y10T 442/2238 (2015.04); Y10T 442/68 (2015.04); Y10T 442/681 (2015.04); Y10T 442/696 (2015.04)

(58) Field of Classification Search
CPC ........... D06M 13/2243; D06M 2200/12; C08J 3/226; C08J 5/18; C08J 3/22; D04H 1/00; Y10T 442/20; Y10T 442/2164; Y10T 442/2221; Y10T 442/696; Y10T 442/2213; Y10T 442/2238; C08K 5/103; D01F 1/10
USPC ................... 524/313; 442/414, 59
See application file for complete search history.

(56) References Cited

U.S. PATENT DOCUMENTS

| | | |
|---|---|---|
| 4,447,570 A | 5/1984 | Cook |
| 4,578,414 A | 3/1986 | Sawyer et al. |
| 5,145,727 A | 9/1992 | Potts |
| 5,149,576 A | 9/1992 | Potts |
| 5,178,931 A | 1/1993 | Perkins |
| 5,178,932 A | 1/1993 | Perkins |
| 5,482,765 A | 1/1996 | Bradley |
| 5,597,647 A | 1/1997 | Powers |
| 5,626,571 A | 5/1997 | Young |
| 5,688,157 A | 11/1997 | Bradley |
| 5,733,603 A | 3/1998 | Turkevich |
| 5,969,026 A | 10/1999 | Mor |
| 5,972,497 A | 10/1999 | Hirwe |
| 5,998,023 A | 12/1999 | Turkevich |
| 6,203,889 B1 | 3/2001 | Quincy |
| 6,436,535 B1 | 8/2002 | Minamoto |
| 6,734,242 B2 | 5/2004 | Nielsen |
| 6,762,137 B2 | 7/2004 | Powers |
| 7,056,845 B2 | 6/2006 | Waeber |
| 7,307,031 B2 | 12/2007 | Carroll |
| 7,662,885 B2 | 2/2010 | Coffey et al. |
| 7,733,744 B2 | 6/2010 | Subilia et al. |
| 8,026,188 B2 * | 9/2011 | Mor ........................ C08J 3/226 427/322 |
| 9,751,993 B2 * | 9/2017 | Mor ........................ C08J 3/226 |
| 2003/0000134 A1 | 1/2003 | Vibien |
| 2004/0002273 A1 | 1/2004 | Fitting |
| 2007/0032607 A1 | 2/2007 | Fuji |

(Continued)

FOREIGN PATENT DOCUMENTS

EP 0152883 A2 8/1985
EP 0353368 A1 2/1990

(Continued)

OTHER PUBLICATIONS

European Search Report dated Apr. 29, 2013, Applicant Techmer PM, LLC, Application No. 10792481.3-1304 / 2446075 PCT/US2010032475.
International Search Report dated Feb. 1, 2011, Application No. PCT/US2010/032475, Applicant Techmer PM, LLC et al.
Japanese Notice of Rejection—Application No. 2012-517519, Applicant Techmer PM, LLC—Pages.
Japanese Notice of Rejection dated Jun. 30, 2015, Application No. 2014-104860, 5 Pages.
Brazilian Preliminary Examination Report dated Oct. 18, 2018, Application No. PI1010046-6, 4 Pages.

Primary Examiner — Camie S Thompson
(74) Attorney, Agent, or Firm — Brooks Kushman P.C.

(57) ABSTRACT

The present invention relates to a hydrophobic additive for use with fabric, fiber, and film. One aspect of the present invention comprises a master batch composition for use in preparing a non-woven fabric in order to increase the hydrophobicity of the non-woven fabric. In one embodiment, the master batch composition includes a polymer and a lipid ester. The lipid ester comprises 10 wt. % to 40 wt. % of the master batch. The fabric, when including the master batch composition, has a contact angle ranging from 100° to 125° when measured according to test method ASTM D2578.

20 Claims, No Drawings

(56) References Cited

U.S. PATENT DOCUMENTS

2007/0079945 A1     4/2007   Noda et al.
2007/0254995 A1    11/2007   Wild et al.
2010/0330861 A1    12/2010   Mor

FOREIGN PATENT DOCUMENTS

| EP | 0738800 | A2 | 10/1996 |
|----|---------|----|---------|
| EP | 0829514 | A2 | 3/1998 |
| GB | 1264713 |    | 2/1972 |
| JP | 04352875 | A | 12/1992 |
| JP | H0586277 | A | 4/1993 |
| JP | H08131941 | A | 5/1996 |
| JP | 2006051649 | A | 2/2006 |
| JP | 2008539306 | A | 11/2008 |
| JP | 5553369 | B2 | 7/2014 |
| WO | 9606966 | A1 | 3/1996 |
| WO | 9628597 | A1 | 9/1996 |
| WO | 2007084514 | A2 | 7/2007 |
| WO | 2008007161 | A1 | 1/2008 |
| WO | 2008106209 | A2 | 9/2008 |

\* cited by examiner

HYDROPHOBIC ADDITIVE FOR USE WITH FABRIC, FIBER, AND FILM

CROSS-REFERENCE TO RELATED APPLICATIONS

This application is a continuation of U.S. application Ser. No. 13/241,744 filed Sep. 23, 2011, which is a continuation of U.S. application Ser. No. 12/491,469 filed Jun. 25, 2009, the disclosures of which are hereby incorporated by reference in their entirety.

TECHNICAL FIELD

The present invention relates to a hydrophobic additive for use with fabric, fiber, and film.

BACKGROUND

Non-woven fabrics are used in many circumstances to provide a barrier to fluids, including contaminated bodily fluids. Contaminated bodily fluids are low surface tension fluids. Typically, non-woven fabrics require a coating or film in order to achieve effective fluid repellency of low surface tension fluids to be considered adequate barrier materials. The non-woven fabric may be manufactured by methods known in the art. Articles incorporating the non-woven fabric may also be manufactured by conventional manufacturing methods. At present, fluorinated and silicone-based components are included in the coatings and films applied to non-woven products to achieve effective fluid repellency of the low surface tension fluids.

But, some people suffer skin irritation during prolonged exposure to fluorinated coatings adjacent to their skin. Application of silicone components to non-woven fabrics in a manufacturing process is extremely difficult and labor-intensive.

What is needed is a composition for fabrics, fibers, and films that repels low surface tension fluids, but which does not cause skin irritation during long exposure and which is relatively easy and inexpensive to manufacture.

SUMMARY

One aspect of the present invention comprises a master batch composition for use in preparing a non-woven fabric in order to increase the hydrophobicity of the non-woven fabric. In one embodiment, the master batch composition includes a polymer and a lipid ester. The lipid ester comprises from 10 wt. % to 40 wt. % of the master batch. The fabric, when including the master batch composition, has a contact angle ranging from 100° to 125° when measured according to test method ASTM D2578.

In yet another embodiment of the present invention, a method for preparing a master batch for use with a staple fiber in order to increase the hydrophobicity of the fiber includes compounding a first polymer with a triglyceride ester to form a master batch. The triglyceride ester comprises from 10 wt. % to 95 wt. % of the master batch. The master batch, when shaped as a film, has a contact angle ranging from 100° to 120° when measured according to test method ASTM D2578.

In yet another embodiment of the present invention, a method for preparing a master batch for use with a non-woven fabric includes compounding a carrier thermoplastic polymer with a lipid ester. The lipid ester comprises 10 wt. % to 95 wt. % of the master batch. The master batch, when shaped as the fabric, has a contact angle ranging from 110° to 120° when measured according to test method ASTM D2578.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Reference will now be made in detail to presently preferred compositions, embodiments and methods of the present invention, which constitute the best modes of practicing the invention presently known to the inventors. But, it should be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the operating examples, or where otherwise expressly indicated, all numbers in this description indicating material amounts, reaction conditions, or uses are to be understood as modified by the word "about" in describing the invention's broadest scope. Practice within the numerical limits stated is generally preferred. Also, unless expressly stated to the contrary:

percent and ratio values are by weight;
  the term "polymer" includes "oligomer," "copolymer," "dimer," "terpolymer," "tetramer" and the like;
  a material group or class described as suitable or preferred for a given purpose in connection with the invention implies any two or more of these materials may be mixed and be equally suitable or preferred;
  constituents described in chemical terms refer to the constituents at the time of addition to any combination specified in the description, and does not preclude chemical interactions among mixture constituents once mixed;
  an acronym's first definition or other abbreviation applies to all subsequent uses here of the same abbreviation and mutatis mutandis to normal grammatical variations of the initially defined abbreviation; and
  unless expressly stated to the contrary, measurement of a property is determined by the same technique as previously or later referenced for the same property.

A master batch provides a convenient product for handling small amounts of critical ingredients like specialized additives in higher concentrations than those occurring in a normal mixture for subsequent dilution with the remainder of the ingredients.

In at least one embodiment of the invention, a master batch composition is blended for use in preparing the non-woven fabric in order to increase the fabric's hydrophobicity. The master batch includes a master batch polymer, which may function as a carrier, and an optional antioxidant. The master batch further includes a lipid ester such as a triglyceride ester. The lipid ester, in at least one embodiment, comprises three fatty acids connected to a glycerol. In at least one embodiment of the invention, the triglyceride ester includes a glycerol polymer backbone. The fatty acids are pendent from the glycerol polymer backbone forming a fatty acid ester. The fatty acids may originate from vegetable, animal, and/or synthetic sources. For example, the vegetable fatty acids typically include large amounts of unsaturated fatty acids such as oleic acid, palmitic acid, linoleic acid, and linolenic acid. In another example, octadecanoic acid, more commonly called stearic acid, may be derived from animal fat and oils as well as some vegetable oils. The stearic acid may also be prepared by hydrogenation of vegetable oils, such as cottonseed oil. In yet a further example, the triglyceride ester may include a mixed hydrogenated vegetable oil, such as one having a CAS registry number of 68334-28-1.

Increasing the fabric's hydrophobicity typically includes lowering of the surface energy of the resulting polymer by the addition of an additive having a lower surface energy than the base polymer. In one embodiment where the lipid ester is the triglyceride ester, such as glycerol tristearate, lowering the surface energy of the resulting polymer is not obvious. Glycerol tristearate has a surface energy of 34.2 mJ/m$^2$, which is relatively high as it exceeds that of many polymers, such as typical polypropylenes, which may surface energies ranging from 29.4 to 30.1 mJ/m$^2$ according some literature values.

In at least one embodiment of the invention, halogen atoms comprise less than 10 wt. % of the lipid ester. In another embodiment of the invention, halogen atoms comprise less than 1 wt. % of the lipid ester. In yet another embodiment of the invention, halogen atoms comprise less than 0.1 wt. % of the lipid ester. In other embodiments the triglyceride ester is substantially halogen-free. In certain embodiments, the triglyceride ester includes no detectable bound and/or ionic halogens.

It is understood that in a fatty acid ester having more than one ester bond, such as in di- or tri-glycerides, the fatty acid-derived group may be the same, or they may be two or even three different fatty acids-derived groups. It is further understood that the additive component may comprise a mixture of mono- di- and/or tri-fatty acid ester (e.g. mono- di- and/or triglyceride) esters with the same fatty-acid derived group per molecule, and/or with different fatty acid-derived groups without exceeding the scope of the invention.

Preferred fatty acids in at least one embodiment may range from a $C_8$ fatty acid to a $C_{30}$ fatty acid; or, in another embodiment range from a $C_{12}$ fatty acid to a $C_{22}$ fatty acid. Suitable vegetable fatty acids typically include unsaturated fatty acids. The fatty acid may suitably be selected from the group comprising an arachidec acid, a stearic acid, a palmitic acid, a myristic acid, a myristoleic acid, an oleic acid, a limoleic acid, a linolenic acid, and an arachidonic acid.

In another further embodiment, a substantially saturated fatty acid is preferred, particularly when saturation arises as a result of hydrogenation of fatty acid precursor. The fatty acids may range from a $C_{12}$ fatty acid to a $C_{22}$ fatty acid as illustrated in [1],

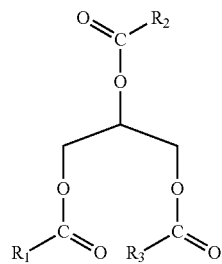

[1]

where $R_1$, $R_2$, and $R_3$ each have a number of carbon atoms ranging from 11 to 21. In at least one other embodiment, the fatty acids may range from a $C_{16}$ fatty acid to a $C_{20}$ fatty acid. In at least one further embodiment, a substantially saturated fatty acid is preferred, particularly when saturation arises as a result of hydrogenation of fatty acid precursor. In at least one further embodiment, a $C_{18}$ fatty acid, stearic acid, is preferred. An example of the stearic acid-substituted fatty acid is [2-octadecanoyloxy-1-(octadecanoyloxymethyl)ethyl] octadecanoate having a CAS registry number of 555-43-1. It should be understood that the preferred triglyceride ester has an esterified glycerol backbone having no non-hydrogen substituents on the glycerol backbone.

It should be understood that while [1] illustrates a simple triglyceride in which all three pendent fatty acids may be the same, other embodiments may include a mixed triglyceride in which two or even three different pendent fatty acids are present without exceeding the scope of the invention. It should be further understood that while the triglyceride ester is illustrated in [1] is a single triglyceride ester formulation, the triglyceride ester used in the preparation of the master batch may include a plurality of triglyceride esters having different pendent fatty acid groups and/or one or more derivatives of the fatty acid, without exceeding the scope of the invention. It should be further understood that while the triglyceride ester illustrated in [1] is a monomer, the triglyceride ester used in the preparation of the master batch may include a polymerized triglyceride ester, such as a polymerized, saturated glyceride ester without exceeding the scope of the invention. It should be further understood that the polymerized triglyceride ester may comprise a mixture of polymers having different numbers of monomeric units included in the polymer. For example the polymerized triglyceride ester may include a mixture of monoesters, diesters, and the like. Increasing the monoester and diester content may tend to increase the hydrophilicity or decrease the improvement in hydrophobicity of the resulting polymer and additive mixture. But, the level of improvement may be suitable for other applications of the fabric.

When the triglyceride ester migrates to the fabric's surface, the triglyceride ester may be removed from the surface by routine laundering, evaporation, or abrasion of the surface. Decreasing the amount of triglyceride ester incorporated in the fabric reduces a water and/or an alcohol repellency of the fabric. When the number-averaged molecular weight of the triglyceride is relatively small the triglyceride may migrate to the surface. Increasing the number-averaged molecular weight of the triglyceride ester slows the migration of the triglyceride ester to the surface of the fabric. It is surprising that migration of the triglyceride ester to the surface of a fabric in which the triglyceride ester is incorporated may be substantially reduced to acceptable levels at relatively low number-averaged molecular weights as in certain embodiments of this invention. In at least one embodiment, the triglyceride ester used in the preparation of the master batch has a number-averaged molecular weight ranging from 500 to 2000. In another embodiment, the triglyceride ester used in the preparation of the master batch has a number-averaged molecular weight ranging from 650 to 1200. In yet another embodiment, the triglyceride ester has a number-averaged molecular weight ranging from 750 to 1000.

In at least one embodiment of the invention, the triglyceride ester may range from 10 wt. % to 95 wt. % of the master batch. In at least one other embodiment, the triglyceride ester may range from 10 wt. % to 40 wt. % of the master batch, which may be adaptable to form a relatively soft pellet when prepared with the carrier polymer. In at least one other embodiment, the triglyceride ester may range from 15 wt. % to 30 wt. % of the master batch In another embodiment, the triglyceride ester may range from 21 wt. % to 27 wt. % of the master batch.

The master batch when formed as a pellet may have a hardness ranging from 20 to 100 Shore A in at least one embodiment, when tested according to test method ASTM D 2240. In another embodiment, the master batch when formed as a pellet may have hardness ranging from 30 to 80. In yet another embodiment, the master batch when formed as a pellet may have a hardness ranging from 40 to 70.

In at least one embodiment of the invention, the triglyceride ester may be prepared with the carrier polymer to form a concentrate. The carrier polymer functions to secure the triglyceride ester and produce the relatively soft pellet form. When in the soft pellet form, in one embodiment, the master batch may be prepared to be blended with a matrix polymer at a range from 1 wt. % to 10 wt. % of the matrix polymer. In another embodiment, the master batch may be prepared to be blended with a matrix polymer at a range from 3 wt. % to 7 wt. % of the matrix polymer. It should be understood that these ranges are limited by the accuracy of dispensing capabilities of equipment typically used to measure the concentrate prior to addition to the matrix polymer. Other ranges of addition may be contemplated when equipment having sufficiently accurate dispensing capabilities is available.

In at least one further embodiment, the triglyceride ester may range from 40 wt. % to 95 wt. % of the master batch, which may be adaptable to form a compacted form when prepared with the carrier polymer. In at least one further embodiment, the triglyceride ester may range from 45 wt. % to 90 wt. % of the master batch, which may be adaptable to form the compacted form when prepared with the carrier polymer.

The master batch when formed as the compacted form may have a hardness ranging from 1 to 20 Shore A, in at least one embodiment, when tested according to test method ASTM D 2240.

In at least one embodiment of the invention, the triglyceride ester may be prepared with the carrier polymer to form the compacted form. The carrier polymer functions to secure the triglyceride ester and produce the compacted form. When in the compacted form, in one embodiment, the master batch may be prepared to be blended with a matrix polymer at a range from 0.05 wt. % to 1 wt. % of the matrix polymer. In another embodiment, the master batch may be prepared to be blended with a matrix polymer at a range from 0.3 wt. % to 0.5 wt. % of the matrix polymer. It should be understood that these ranges are often limited by equipment used to measure the concentrate prior to addition to the matrix polymer. Other ranges of addition may be contemplated when equipment having sufficiently accurate dispensing capabilities is available.

The carrier polymer, in at least one embodiment, may be a hydrophobic polymer, such as a thermoplastic polymer. Non-limiting examples of thermoplastic polymers may include a polyolefin, such as a polyethylene, a polypropylene, or a polyolefin copolymer; a polyamide, such as a polyamide-6, a polyamide-11, or a polyamide-66; a polyethylene terephthalate; a polyester, such as a biodegradable plastic poly-3-hydroxybutyrate (PHB); a biodegradable polymer, such as an ASTM D6400-type biodegradable polymer, which includes starch-based plastics like a polylactic acid; and/or a compostable polymer such as an ASTM D6002-type compostable polymer.

Examples of the polypropylene may include, but are not limited to, a syndiotactic polypropylene, an atactic polypropylene, a metallocene-based polypropylene; a single-site-catalyst-derived polypropylene, and/or a constrained-geometry-catalyst-derived polypropylene. It should be understood that the polypropylene may be a homopolymer or a copolymer without exceeding the scope of this invention. Non-limiting examples of the copolymer include block copolymers, graft copolymers, random copolymers, and alternating copolymers. A modifying polymer that may comprise a portion of the copolymer may include acrylic compounds such as methacrylates; ionmeric compounds; or other thermoplastics, such as a polyamide without exceeding the scope of the invention.

The quantity of the triglyceride ester that may be incorporated in the carrier polymer depends upon the amount of regions of the carrier polymer having an amorphous crystalline structure or a semi-crystalline structure. The amount of crystallinity in a carrier polymer may be determined by methods known in the art, such as differential scanning calorimetry, x-ray diffraction, small angle x-ray scattering (SAXS), infrared spectroscopy, or the amount of master batch that may be blended into the carrier polymer, when measured against the quantity of uptake of the master batch by known standard polymers having known percent crystallinity values.

In certain embodiment of the invention, the carrier polymer, which is hydrophobic, includes either an amorphous region or a semi-crystalline region comprising a range of 1 wt. % to 100 wt. % of the carrier polymer as reported by the amount of master batch taken up in the carrier polymer. In other embodiment of the invention, the carrier polymer includes an amorphous region or a semi-crystalline region comprising 20 wt. % to 95 wt. % of the carrier polymer. In yet another embodiment of the invention, the carrier polymer includes an amorphous region or a semi-crystalline region comprising 25 wt. % to 70 wt. % of the carrier polymer.

The master batch may be melt blended as an additive to a matrix polymer suitable for making a fiber, such as a spun-bonded fiber, a meltblown fiber, or other types of fibers. The master batch, when blended as an additive into the matrix polymer, lowers the surface tension of the fibers thereby increasing the barrier properties of the non-woven fabric prepared from the fibers. The result is a non-woven fabric suitable as a barrier material for low surface tension fluids. The non-woven fabric contains substantially no fluorine-based or other halogen-based chemicals derived from the fibers.

The spun-bonded fibers may be prepared by blending the master batch with the matrix polymer. The matrix polymer, in at least one embodiment, may be a hydrophobic polymer, such as a thermoplastic polymer. Non-limiting examples of thermoplastic polymers may include a polyolefin, such as a polyethylene, a polypropylene, and a polyolefin copolymer; a polyamide, such as a polyamide-6, a polyamide-11, or a polyamide-66; a polyethylene terephthalate; a polyester, such as a biodegradable plastic poly-3-hydroxybutyrate (PHB); an biodegradable polymer such as an ASTM D6400-type biodegradable polymer, which includes starch-based plastics like a polylactic acid; and/or a compostable polymer such as an ASTM D6002-type compostable polymer. Examples of the polypropylene may include, but are not limited to, a syndiotactic polypropylene, an atactic polypropylene, a metallocene-based polypropylene, a single-site-catalyst-derived polypropylene, and/or constrained-geometry-catalyst-derived polypropylene. It should be understood that the polypropylene may be a homopolymer or a copolymer without exceeding the scope of this invention. Non-limiting examples of the copolymer include a block copolymer, a graft copolymer, a random copolymer, and an alternating copolymer. A modifying polymer that may comprise a portion of the copolymer may include acrylic compounds such as methacrylates; ionmeric compounds; or other thermoplastics, such as polyamide, without exceeding the scope of the invention.

The polypropylene matrix polymer is preferred to have a relatively narrow molecular weight distribution that allows a relatively higher draw ratio when extruded through a plurality of fine, usually circular, die capillaries as molten threads or filaments. The relatively narrow molecular weight distribution of the polypropylene generally allows thinner fibers to be spun, especially when combined with a matrix polymer having a relatively high melt flow rate. For example, in at least one embodiment, a melt flow rate exceeds 1000 grams per 10 minutes when measured according to ASTM D1238. In another embodiment of the invention, the melt flow rate may range from 1200 grams per 10 minutes to 2000 grams per 10 minutes without exceeding the scope of the invention.

The spun-bonded fibers produced, using a master batch composition according to at least one embodiment of this invention, are generally smaller than 50 µm in average diameter. In another embodiment of invention, spun-bonded fibers range in average diameter from 1 µm to 25 µm. In a further embodiment of invention, spun-bonded fibers range in average diameter from 8 µm to 23 µm. In yet another embodiment of the invention spun-bonded fibers range in average diameter from 12 µm to 20 µm.

In at least one embodiment, a meltblown web or layer comprises meltblown fibers that have a number average fiber diameter ranging from 1 µm to 5 µm. In another embodiment, the meltblown fibers have a number-average fiber diameter ranging from 1 µm to 4 µm. In yet another embodiment, the meltblown fibers have a number-average fiber diameter ranging from 1 µm to 3 µm. The number-average fiber diameters are determined by using a Scanning Electron Microscope (SEM) and its image analysis software. A magnification is chosen such that the fibers are suitably enlarged for measurements, e.g. between 1000 and 10,000. At least 100 fibers are measured, and the number-average fiber diameter is calculated with the software.

It should be understood that the fibers of one or more of the webs or layers herein may include nanofibers, with a diameter of less than 1000 nanometers. In at least one embodiment, a nanofiber-containing layer or web may consist exclusively of nanofibers. In another embodiment, the nanofiber-containing layer may be mixed with fibers of a larger diameter.

It should be understood that while spun-bonded fibers are discussed above, the composition in at least one embodiment may be made be extruded by other methods, such as preparing fibers by melt blowing without exceeding the scope of the invention.

The non-woven fabric comprised of the spun-bonded fibers may be a single-ply fabric such as a spun-bonded sheet or a laminate, such as a spun-bonded layer-meltblown layer-spun-bonded layer (SMS) laminate. It should be understood that the laminate may be of either a balanced or an unbalanced structure. An additional non-limiting example of the balanced laminate may be a spun-bonded layer-meltblown layer-meltblown layer-meltblown layer-spun-bonded layer (SMMMS) laminate.

The spun-bonded and/or meltblown fabric may be suitable for forming into a hygiene product by methods known in the art. Non-limiting examples of hygiene products include products like clothing, medical coverings, and/or personal care sanitary articles.

When the additive is meltblended or coated on to the non-woven fabric, the fabric becomes a barrier to low surface tension fluids. In at least one embodiment of the invention the surface energy of the fabric has a contact angle that increases to be in the range from 100° to 125° when measured according to test method ASTM D2578. In another embodiment, the contact angle of the fabric is in the range from 108° to 122°. In another embodiment, the contact angle of the fabric is in the range from 117° to 120°. It should be understood that while may embodiments are described using methods such as meltblending or coating, any method for liquifying the additive may be used, including, but not limited to, dissolution in a solvent or emulsification. Further, the additive may be dispersed in the carrier polymer by any conventional method such as compounding, such as with a twinscrew extruder, comminution or milling without exceeding the scope of the invention.

In at least one embodiment of the invention the surface energy of the fabric, when the additive is meltblended or coated on the fabric, has an alcohol repellency ranging from 25 to 60 when measured according to method INDA 80.8. In another embodiment, the alcohol repellency ranges from 30 to 55. In yet another embodiment, the alcohol repellency ranges from 35 to 50.

In at least one embodiment of the invention the surface energy of the fabric, when the additive is meltblended or coated on the fabric, has an hydrohead ranging from 10 inches of water to 20 inches of water when measured according to method IST 80.6 (0.01). In another embodiment, the hydrohead ranges from 12 inches of water to 18 inches of water. In yet another embodiment, the hydrohead ranges from 14 inches of water to 16 inches of water.

A representative spunmelt nonwoven fabric made of standard polypropylene, used as a control, with an area weight of about 22 g/m$^2$ can, for example, have a low surface tension liquid strike through (32 mJ/m$^2$) of 16 seconds (SMMS) or 26 seconds (SMMMS) when measured according to EDANA method WSP 70.3. When using the hydrophobic additive, the nonwoven barrier sheet and/or barrier component, according to at least one embodiment of the present invention, has a surface tension strike through value, which has increased by at least 25%, as determined by the method above for a liquid having a surface tension of 32 mN/m. In another embodiment the surface tension strike through value increases by at least 50% relative to the standard polypropylene control. In yet another embodiment the surface tension strike through value increases by at least 100%. In still yet another embodiment the surface tension strike through value increases by at least 200%.

The surface tension strike-through value may be limited optionally to less than 200 seconds, or less than 150 seconds or less than 100 seconds. A nonwoven barrier sheet or barrier component is considered to have the above low surface tension strike through values if it has this value at any part of the material, excluding areas comprising elastic material or edges being attached to other materials.

To prepare the master batch, in at least one embodiment of the invention, for use with the staple fiber in order to increase the fiber's hydrophobicity, the carrier polymer is compounded with the lipid ester. For example, the metallocene-based polypropylene is meltblended with the triglyceride ester. The triglyceride ester comprises 10 wt. % to 95 wt. % of the master batch. When the master batch is shaped as a staple fiber, the contact angle ranges from 100° to 125° when measured according to test method ASTM D2578.

To prepare the hydrophobic spun-bonded fiber in at least one embodiment of the invention, the master batch, as prepared above where the triglyceride ester comprises 10 wt. % to 40 wt. % of the master batch, is meltblended with the matrix polymer to form a fiber precursor. The fiber precursor compound is spun-bonded to form a spun-bonded fiber suitable for use in making a spun-bonded fabric. The master batch may comprise the range from 1 wt. % to 10 wt. % of the spun-bonded fiber.

To prepare the hydrophobic spun-bonded fiber or a melt-blown fiber in at least embodiment of the invention, the master batch, as prepared above where the triglyceride ester comprises 40 wt. % to 95 wt. % of the master batch, is meltblended with the matrix polymer to form a fiber precursor. The fiber precursor compound is either spun-bonded to form a spun-bonded fiber or melt-blown to form a melt-blown fiber, either of which is suitable for use in making the fabric. It should be understood that the fabric may the single layer fabric or the laminate fabric. The master batch may comprise the range from 0.05 wt. % to 1 wt. % of the spun-bonded fiber or the melt-blown fiber.

Additional embodiments of the present invention include hydrophobic additives for use with a filament-type fiber, a woven fabric, and/or a woven fabric component. Non-limiting examples of the filament fiber include a staple fiber, a textile filament fiber, an industrial filament fiber, and a tow fiber. Additional examples of woven fabric and woven fabric components include roll stock including calendared roll stock; a strand; a yarn, including a tire yarn; a filament; a rod; a broad-woven fabric; a flat-knit fabric; a fiber fil fabric; and a sheet fabric, including a stacked or an oriented bias sheet fabric. Examples of the oriented bias fabric include a 0/90 weave and/or a 45/45 bias fabric. In addition, the fabric can be oriented along the machine direction (MD).

The filament-type fiber, in at least one embodiment, may have a length ranging from 1 inch to 7 inches. In other embodiments, the length of the staple fiber may range from 1.1 inch to 3 inches. In yet another embodiment, the staple fiber may range from 1.25 inches to 2 inches.

The filament-type fiber, in at least one embodiment, may have a diameter ranging from 0.25 to 100 denier/filament. In at least another embodiment, the staple fiber may have a diameter ranging from 0.25 to 18 denier/filament. In yet another embodiment, the staple fiber may have a diameter ranging from 0.25 to 3 denier/filament.

The hydrophobic additive, in at least one embodiment of the present invention, may range from 0.1 to 1.5 wt. % of a dry woven fabric, a dry woven fabric component, or a dry fiber. In another embodiment, the active ingredient hydrophobic additive may range from 0.15 to 0.8 wt. % of the dry fabric or dry fiber. In yet another embodiment, the active ingredient hydrophobic additive may range from 0.2 to 0.6 wt. % of the dry fabric or the dry fiber.

The fiber may also include a multicomponent fiber, such as a bicomponent fiber. Examples of the bicomponent fiber may include, but are not limited to, a side-by-side configuration, a sheath-core configuration, an island-in-the-sea configuration, a segmented pie configuration, and/or a ribbon configuration. While the embodiments recite a hydrophobic additive, it should be understood that the additive may also be oleophobic or lyophobic without exceeding the scope of the invention.

The hydrophobic additive, in at least one embodiment of the present invention may range from 0.1 to 1.5 wt. percent of the dry film. In another embodiment, the hydrophobic additive may range from 0.15 wt. % to 0.8 wt. % of the dry film. In yet another embodiment, the hydrophobic additive may range from 0.2 wt. % to 0.6 wt. % of the dry film.

In yet another embodiment of the invention, the hydrophobic additive may be formed as a hollow membrane fiber, including microporous hollow fibers for use as membrane filters; an encapsulated hydrophilic fiber, such as a lipocell fiber where the hydrophilic fiber is encapsulated by a mixture including the hydrophobic additive; and a hydrophobic insulative fiber, such as may be used in home-insulation batting.

The hollow fiber membrane having the hydrophobic additive, in at least one embodiment of the invention, may have an outer diameter ranging from 200 mm to 5,000 mm. In another embodiment, the hollow fiber membrane may have a diameter ranging from 300 mm to 1,000 mm. In yet another embodiment of the invention, the hollow fiber membrane may have a diameter ranging from 500 mm to 750 mm.

The hollow fiber membrane having the hydrophobic additive, in at least one embodiment of the invention, may have a wall thickness ranging from 50 mm to 300 mm. In another embodiment of the invention, the hollow fiber membrane having the hydrophobic additive may have a wall thickness ranging from 75 mm to 250 mm. In yet another embodiment of the invention, the hollow fiber membrane having the hydrophobic additive may have a wall thickness ranging from 100 mm to 200 mm.

The hollow fiber membrane having the hydrophobic additive may have a microporous configuration. In at least one embodiment of the present invention, the microporous configuration may have a diameter of a plurality of micropores ranging from 0.1 mm to 25 mm. In another embodiment of the present invention, the hollow fiber membrane having the hydrophobic additive may have the micropores having diameters ranging from 0.3 mm. In yet another embodiment of the present invention, the hollow fiber membrane having the hydrophobic additive may have a diameter of a micropore, the diameter of the micropore ranging from 0.18 to 1 mm.

The methods of making hollow fiber membranes, including the membranes having a microporous configuration, are known in the art.

In other embodiments, the hydrophobic additive may be added for use with a film. Examples of the film include, but are not limited to, a film used to make laminates and balanced composites, including an outer coating; an anti-stick film; an anti-contamination film; a self-cleaning film including a superphobic film having a contact angle exceeding 90° or an ultraphobic fiber having a contact angle exceeding 150°.

In yet a further embodiment of the invention, the hydrophobic additive in a mixture with a film-forming carrier polymer is formed as the composite-making film. Non-limiting examples of the composite-making film include a packaging material such as used in making a sling bag, a sealed bag, or a reinforcement, such as a tape. It should be understood that the composite-making film, including the tape, may also be formed as a cross-woven or needled fabric without departing from the scope of the invention. The composite-making film may also be used in forming a laminate, an unbalanced composite, and/or a balanced composite. In the laminate, the unbalanced composite and/or the balanced composite, the composite-making film may be used as an outer coating for either another dissimilar and/or similar film, a fabric, or any other suitable substrate.

The packaging material may be used for any suitable product requiring relative hydrophobicity in its packaging. Non-limiting examples of products requiring relatively hydrophobic packaging include coils of steel in order to prevent rust, tires, and cones of yarn. It should be understood that the packaging material and the master batch, in general, may have other adjuvants in addition to the hydrophobic additive as an option. An example of an adjuvant is an anti-static adjuvant.

The packaging material may also have relatively high tensile energy absorption. The tensile energy adsorption (TEA) of the fabric and/or fiber measures a toughness of the fabric used in the packaging material and may be measured by method ASTM D1682. This test method measures the energy to break the fabric as indicated by the area underneath the stress strain curve developed using this test method.

In at least one embodiment, the packaging material or other fabric, films, fibers, or articles containing the master batch may have the TEA ranging from 1500 g/inch$^2$ to 6500 g/inch$^2$. In another embodiment, the packaging material or other fabric, film, fiber, or article containing the master batch have the TEA ranging from 2000 g/inch$^2$ to 5500 g/inch$^2$.

In other embodiments of the invention, the hydrophobic additive may substitute for other materials typically used in waterproofing fabric, fiber, and/or film. The substitution may be made in total or in part by the hydrophobic additive and/or a mixture containing the hydrophobic additive. Non-limiting examples of material substitutions in which the hydrophobic additive and/or a mixture containing the hydrophobic additive may be used include replacement of emulsion polymers comprised of hydrophobic monomers and/or reactive monomers; lubricant finishes; and either "permanent" or temporary coatings, such as ester finishes. Non-limiting examples of the ester finish include alkyl and/or alkenyl, phosphoric esters, neutralized phosphoric esters, a polysiloxane coating, a silicone coating, and/or a surface modifiers, such as a water soluble surfactant. A non-limiting example of a surface modifier includes a water soluble compound free of lipophilic end groups and having no or limited surfactant properties, such as a $C_3$-$C_{12}$ alkyl or alkenyl phosphate metal/metal or earth salt.

In another embodiment of the invention, the master batch is coated on to the spun-bonded fiber after the fiber is extruded, and particularly, when the fiber is within 50° C. of the melting temperature of the carrier polymer. The master batch may be coated using methods known in the art, such as a solvent-carried solution or as a melt coextrusion.

EXAMPLE 1

Meltblending of the lipid ester into the carrier polymer is conducted under the following conditions. The extruder is a nine-zone Leistriz 34-mm twin screw extruder. The screw has a length to diameter (L/D) ratio of 38. The screw is a 34-mm diameter co-rotating screw with high-pitched kneading and turbine mixing elements.

Solid lipid ester is optionally blended with the carrier polymer in a low intensity mixer and introduced in zone 1. The extruder has an optional liquid injection port in zone 4, which is capped when adding a solid lipid ester and is open when adding a liquid lipid ester. The extruder is vented to the atmosphere at zone 6. The extruder's die has two holes and uses a 20 mesh screen immediately before the die.

The screw speed is set at 300 revolutions per minute (RPM). The temperature settings in each zone of the extruder are as follows:

| Zone | Carrier polymer Polyethylene | Carrier polymer Polypropylene |
| --- | --- | --- |
| 1 | 150° F. | 150° F. |
| 2 | 320° F. | 380° F. |
| 3 | 320° F. | 380° F. |
| 4 | 330° F. | 380° F. |
| 5 | 330° F. | 380° F. |
| 6 | 340° F. | 380° F. |
| 7 | 340° F. | 380° F. |
| 8 | 340° F. | 390° F. |
| 9 | 360° F. | 400° F. |

Master Batch A: The lipid ester glycerol monostearate having 90% monoester and 10% diester is blended with a low density polyethylene polymer at 20 wt. % loading of the lipid ester in the polyethylene polymer.

Master Batch B: The lipid ester glycerol monostearate having 40% monoester and 60% diester is blended with a low density polyethylene polymer at 20 wt. % loading of the lipid ester in the polyethylene polymer.

Master Batch C: The lipid ester glycerol mono-oleate is blended with the low density polyethylene polymer at 20 wt. % loading of the lipid ester in the polyethylene polymer.

Master Batch D: The lipid ester glycerol tristearate is blended with the low density polyethylene polymer at 20 wt. % loading of the lipid ester in the polyethylene polymer.

The master batches A, B, C, and D are each blended a low density polyethylene matrix polymer. The master batches comprise a 5 wt. % loading of a mixture of the selected master batch in the matrix polymer. The matrix polymer has a melt flow rate of 2 grams per 10 minutes. The blended master batch and matrix polymer mixtures are blow molded as a film having 0.001 inch thickness.

The contact angle is measured on the films according to the test method ASTM D2578.

| Composition | Contact Angle (degrees) |
| --- | --- |
| Control low-density polyethylene (LDPE) film | 95 |
| Mater Batch A and LDPE | 43 |
| Mater Batch B and LDPE | 86 |
| Mater Batch C and LDPE | 63 |
| Mater Batch D and LDPE | 104 |
| Fluorinated organic compound (Uniplex FE700) and LDPE[1] | |

[1]The fluorinated organic compound is supplied by Unitex Chemical Corporation (Greensboro, NC).

The greater the contact angle, the more hydrophobic the composition is and the better able to repel low surface tension fluids.

EXAMPLE 2

Spun-bonded and meltblown fabrics are prepared using polypropylene having either a 1 wt. % loading of glycerol tristearate as the active lipid ester ingredient or a fluorinated organic compound FX-1801 as the active ingredient. With no oven aging of the fabrics, the hydrohead is measured according to method IST 80.6 (0.01).

| Sample-Active Ingredient | Hydrohead |
| --- | --- |
| 25 gm/m² polypropylene fabric control | 15.1 |
| 1 wt. % glycerol tristearate | 15.9 |
| 1 wt. % fluorinated organic compound FX-1801)[1] | 3.5 |

[1] The fluorinated organic compound is supplied by 3M Corporation. (St. Paul, MN).

EXAMPLE 3

Spun-bonded and meltblown fabrics are prepared using polypropylene having either a 2.5 wt. % loading of glycerol tristearate as the active ingredient or a fluorinated organic compound Uniplex FE 700 plus 0.35 wt. % triglyceride) as the active ingredient. With no oven aging of the fabrics, the alcohol repellency is measured according to method IST 80.8. The alcohol repellancy rating number is one-tenth of the alcohol repellency measured according to IST 80.8.

| Sample-Active Ingredient | Alcohol Repellency Rating Number |
| --- | --- |
| 25 gm/m² polypropylene fabric (control) | 2 |
| 2.5 wt. % glycerol tristearate | 3 |
| 2.5 wt. % fluorinated organic compound (fluorinated organic compound Uniplex FE 700 plus 0.35 wt. % triglyceride)[1] | 3.5 |

[1] The fluorinated organic compound is supplied by Unitex Chemical Corporation (Greensboro, NC).

EXAMPLE 4

Spun-bonded and meltblown fabrics are prepared using polypropylene having either a 2.5 wt. % loading of glycerol tristearate as the active ingredient or a fluorinated organic compound Uniplex FE 700 plus 0.35 wt. % triglyceride) as the active ingredient. With oven aging of the fabrics at 50° C. for 2 hours, the alcohol repellency is measured according to method IST 80.8, and converted to the alcohol repellency rating number by dividing by 10.

| Sample-Active Ingredient | Alcohol Repellency Rating Number |
| --- | --- |
| 25 gm/m² polypropylene fabric control | 2 |
| 2.5 wt. % glycerol tristearate | 4 |
| 2.5 wt. % fluorinated organic compound (fluorinated organic compound Uniplex FE 700 plus 0.35 wt. % triglyceride) | 6 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A master batch for use in preparing a non-woven fabric in order to increase the hydrophobicity of the non-woven fabric, the master batch comprising:
    a carrier polymer selected from the group consisting of polyolefin, polyester, polylactic acid, poly-3-hydroxybutyrate, polyamide, and copolymers thereof; and
    a triglyceride ester comprising 10-40 wt. % of the master batch, wherein when a fabric is prepared with the master batch, the fabric has a contact angle ranging from 100° to 125° when measured according to test method ASTM D2578.

2. The master batch of claim 1, wherein the master batch is substantially halogen-free.

3. The master batch of claim 1, wherein the triglyceride ester has a number-averaged molecular weight ranging from 500 to 2000.

4. The master batch of claim 1, wherein the triglyceride ester includes a fatty acid ranging from $C_8$-$C_{30}$.

5. The master batch of claim 1, further comprising an antioxidant.

6. The master batch of claim 1, wherein the triglyceride ester has a number-averaged molecular weight ranging from 750 to 1000.

7. The master batch of claim 1, wherein the carrier polymer secures the triglyceride ester to form a pellet having a hardness ranging from 20 to 100 Shore A when measured according to test method ASTM D2240.

8. The master batch of claim 1, wherein the carrier polymer is a hydrophobic polymer including an amorphous region or a semi-crystalline region comprising a range of 1 wt. % to 100 wt. % of the carrier polymer.

9. A method for preparing a solid master batch usable to form a fiber, the method comprising:
    providing a hydrophobic carrier polymer including an amorphous region or a semi-crystalline region comprising a range of 1 wt. % to 100 wt. % of the first polymer; and
    blending a triglyceride ester with the hydrophobic carrier polymer and solidifying the materials to form the master batch, the triglyceride ester having a number-averaged molecular weight ranging from 500 to 2000, and comprising 10-95 wt. % of the master batch, wherein the master batch, which when shaped as a film, is hydrophobic and has a contact angle ranging from 100° to 125° when measured according to test method ASTM D2578.

10. The fiber of claim 9, wherein the carrier polymer is selected from the group consisting of polyolefin, polyester, polylactic acid, poly-3-hydroxybutyrate, polyamide, and copolymers thereof.

11. The fiber of claim 9, wherein the master batch is in a form of a pellet having a hardness ranging from 1 to 20 Shore A when measured according to test method ASTM D2240.

12. A master batch for use in preparing a hydrophobic non-woven fabric in order to increase the hydrophobicity of the non-woven fabric, the master batch:
    a hydrophobic carrier polymer comprising an amorphous region or a semi-crystalline region comprising a range of 1 wt. % to 100 wt. % of the hydrophobic polymer; and
    a saturated triglyceride ester having a number-averaged molecular weight ranging from 500 to 2000, wherein when a fabric is prepared with the master batch, the fabric has a contact angle ranging from 100° to 125° when measured according to test method ASTM D2578 and is hydrophobic.

13. The master batch of claim 12, wherein the saturated triglyceride ester is a polymerized, saturated triglyceride ester having the formula [1]:

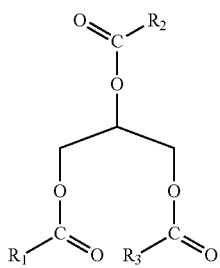

wherein $R_1$, $R_2$, and $R_3$ each have a number of carbons ranging from 11-21.

14. The master batch of claim 13, wherein $R_1$, $R_2$, and $R_3$ comprise a stearic substituent.

15. The master batch of claim 12, wherein the hydrophobic carrier polymer is selected from the group consisting of polyolefin, polyester, polylactic acid, poly-3-hydroxybutyrate, polyamide, and copolymers thereof.

16. The master batch of claim 12, wherein the hydrophobic carrier polymer is a thermoplastic polymer.

17. The master batch of claim 12, wherein the saturated triglyceride ester comprises 10-40 wt. % of the master batch, and the master batch is in a form of a pellet having a hardness ranging from 20 to 100 Shore A when measured according to test method ASTM D2240.

18. The master batch of claim 12, wherein the saturated triglyceride ester comprises 40-95 wt. % of the master batch, and the master batch is in a form of a pellet having a hardness ranging from 1 to 20 Shore A when measured according to test method ASTM D2240.

19. The master batch of claim 12, wherein the master batch is substantially halogen-free.

20. The master batch of claim 12, further comprising an antioxidant.

* * * * *